(12) United States Patent
Hsu

(10) Patent No.: US 7,614,522 B2
(45) Date of Patent: Nov. 10, 2009

(54) CONTAINER STRUCTURE

(75) Inventor: Mu-Chuan Hsu, Taipei (TW)

(73) Assignee: L&F Plastics Co., Ltd., Taipei (TW)

( * ) Notice: Subject to any disclaimer, the term of this patent is extended or adjusted under 35 U.S.C. 154(b) by 381 days.

(21) Appl. No.: 11/557,389

(22) Filed: Nov. 7, 2006

(65) Prior Publication Data

US 2008/0105674 A1    May 8, 2008

(51) Int. Cl.
*B65D 43/10* (2006.01)
*B65D 51/16* (2006.01)
*B65D 41/14* (2006.01)

(52) U.S. Cl. .............. 220/367.1; 220/374; 220/793; 220/784

(58) Field of Classification Search .......... 220/367.1, 220/203.09, 573.1, 785, 203.29, 793
See application file for complete search history.

(56) References Cited

U.S. PATENT DOCUMENTS

| | | | | |
|---|---|---|---|---|
| 4,555,043 A * | 11/1985 | Bernhardt | ........ | 220/783 |
| 5,310,981 A * | 5/1994 | Sarnoff et al. | ........ | 219/731 |
| 6,168,044 B1 * | 1/2001 | Zettle et al. | ........ | 220/784 |
| 7,357,272 B2 * | 4/2008 | Maxwell | ........ | 220/785 |
| 2002/0175164 A1 * | 11/2002 | Dees et al. | ........ | 220/4.24 |
| 2003/0155354 A1 * | 8/2003 | Tucker | ........ | 220/4.24 |
| 2004/0188442 A1 * | 9/2004 | Ohyama | ........ | 220/367.1 |
| 2004/0245261 A1 * | 12/2004 | Stanos et al. | ........ | 220/793 |
| 2005/0150890 A1 * | 7/2005 | Wang | ........ | 220/256.1 |
| 2006/0000842 A1 * | 1/2006 | Maxwell | ........ | 220/780 |
| 2008/0073366 A1 * | 3/2008 | Backaert | ........ | 220/785 |
| 2008/0073368 A1 * | 3/2008 | Custer et al. | ........ | 220/793 |
| 2008/0110911 A1 * | 5/2008 | Chen | ........ | 220/788 |
| 2008/0197134 A1 * | 8/2008 | Maxwell | ........ | 220/367.1 |

* cited by examiner

*Primary Examiner*—Anthony D Stashick
*Assistant Examiner*—Niki M Eloshway
(74) *Attorney, Agent, or Firm*—Alan Kamrath; Kamrath & Associates PA

(57) ABSTRACT

A container structure includes a lid and a holder. The lid has a through hole having air-permeable troughs having inner and outer openings. The inner and outer openings of adjacent air-permeable troughs are in opposite directions. An elastic plug is fitted within the through holes, and an air-permeable passageway is formed. By providing the air-permeable passageway, high-temperature circular vapors are regulated and vented. Thus, the lid is prevented from being blown open by the vapors. Clip-on pieces and lower ribs are provided on a sealing portion of the lid. Upward bending portions and upper ribs are provided on a marginal frame portion of the holder. The lid is securely fitted onto the holder by mutual restriction of the lower and upper ribs. Pressing the clip-on pieces down will deform the sealing portions, and will free the lower ribs from the restriction of the upper ribs to open the lid quickly.

6 Claims, 8 Drawing Sheets

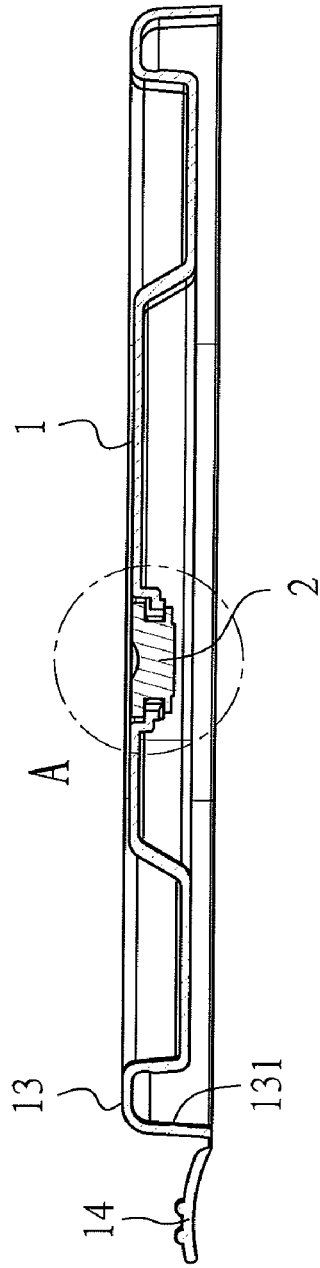
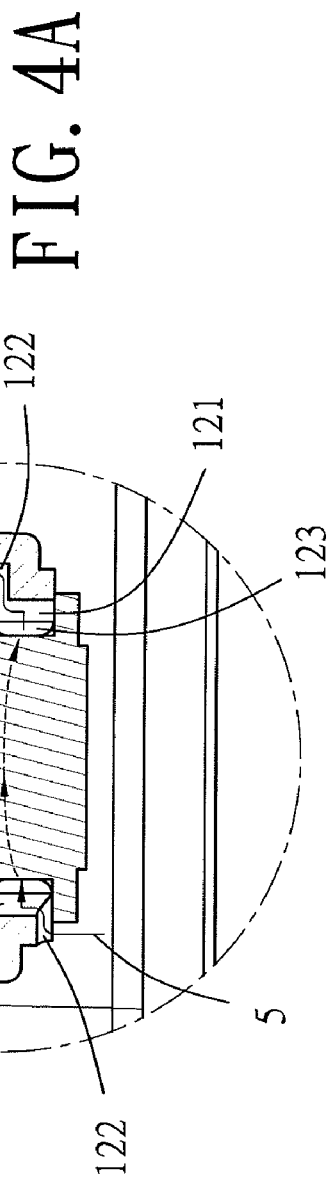

CONTAINER STRUCTURE

FIELD OF THE INVENTION

The invention relates to a container structure, and, more particularly, to a microwavable container including a lid having a mechanism for venting high temperature vapors and a structure for opening the lid quickly upon pressing.

DESCRIPTION OF PRIOR ART

Traditionally, people have relied on methods like roasting, boiling, or stewing for the preparation of foods. However, since the standards in general knowledge and household income have vastly improved, people increasingly accept the microwave oven as an efficient way to heat or prepare foods. The convenience and quickness in heating or preparing foods have made the use of microwave ovens even more popular in general households, schools, restaurants, or other public places.

However, when using microwave ovens for heating or preparing foods, it is common to encounter problems like dehydration, drying, and hardening of foods. As a result, all sorts of packaging materials have been developed for preparing foods in microwave ovens, such as wrapping films, microwavable packs, and microwavable containers. But when foods are sealed in the products mentioned above and are heated in microwave ovens, incidents of explosion often occur due to the rapid increase in temperature and pressure of the food. Therefore, the manufacturers of microwave ovens often recommend leaving an opening in the packaging when using microwave ovens for food preparation, so that the high temperature, high pressure and steam generated from heating can be released to avoid explosions.

Moreover, there are a variety of ways for assembling the lid and the holder of microwavable containers, such as having a clip extending from the edge of the lid for fastening the container, having a fastening piece located on the lid for securing the holder, or the like. However, to open the microwavable containers described above, the users' hands come into direct contact with the hot container, which is not only inconvenient but also dangerous.

SUMMARY OF THE INVENTION

Based on the air-permeable microwavable containers disclosed above, the invention proposes an improved container structure which can be manufactured and assembled more easily and includes a lid having a mechanism for venting vapors and a structure for opening the lid quickly upon pressing.

The primary objective of the invention is to provide a microwavable container including a lid and a holder. The lid has a recess formed with a through hole therein and a plurality of air-permeable troughs extending from the periphery of the through hole. Each air-permeable trough has inner and outer openings and the inner and outer openings of adjacent air-permeable troughs are set in opposite directions. An elastic plug is fitted into the through holes, forming an air-permeable passageway. When the container is heated, ventilation can be achieved by the air-permeable passageway of the lid and high-temperature circular vapors generated from microwave heating are regulated and vented, Thus the lid is prevented from being blown open by the vapors accumulated within the container.

A further objective of the invention is to provide a microwavable container including a lid having a sealing portion and a holder having a marginal frame portion. The sealing portion of the lid has clip-on pieces extending from its two opposite sides and lower ribs protruding from its inner surface. The marginal frame portion of the holder has upward bending portions extending from its two opposite sides and upper ribs protruding from its outer surface. Pressing the clip-on pieces down will deform the sealing portion and free the lower ribs from the restriction of the upper ribs to open the lid quickly.

BRIEF DESCRIPTION OF DRAWINGS

FIG. 4 is a cross-sectional view taken alone line 4-4 of FIG. 3 illustrating vapors ventilation;

FIG. 4A is partial, enlarged, sectional view of the encircled area A of FIG. 4.

DETAILED DESCRIPTION OF PREFERRED EMBODIMENTS

Figure 1:
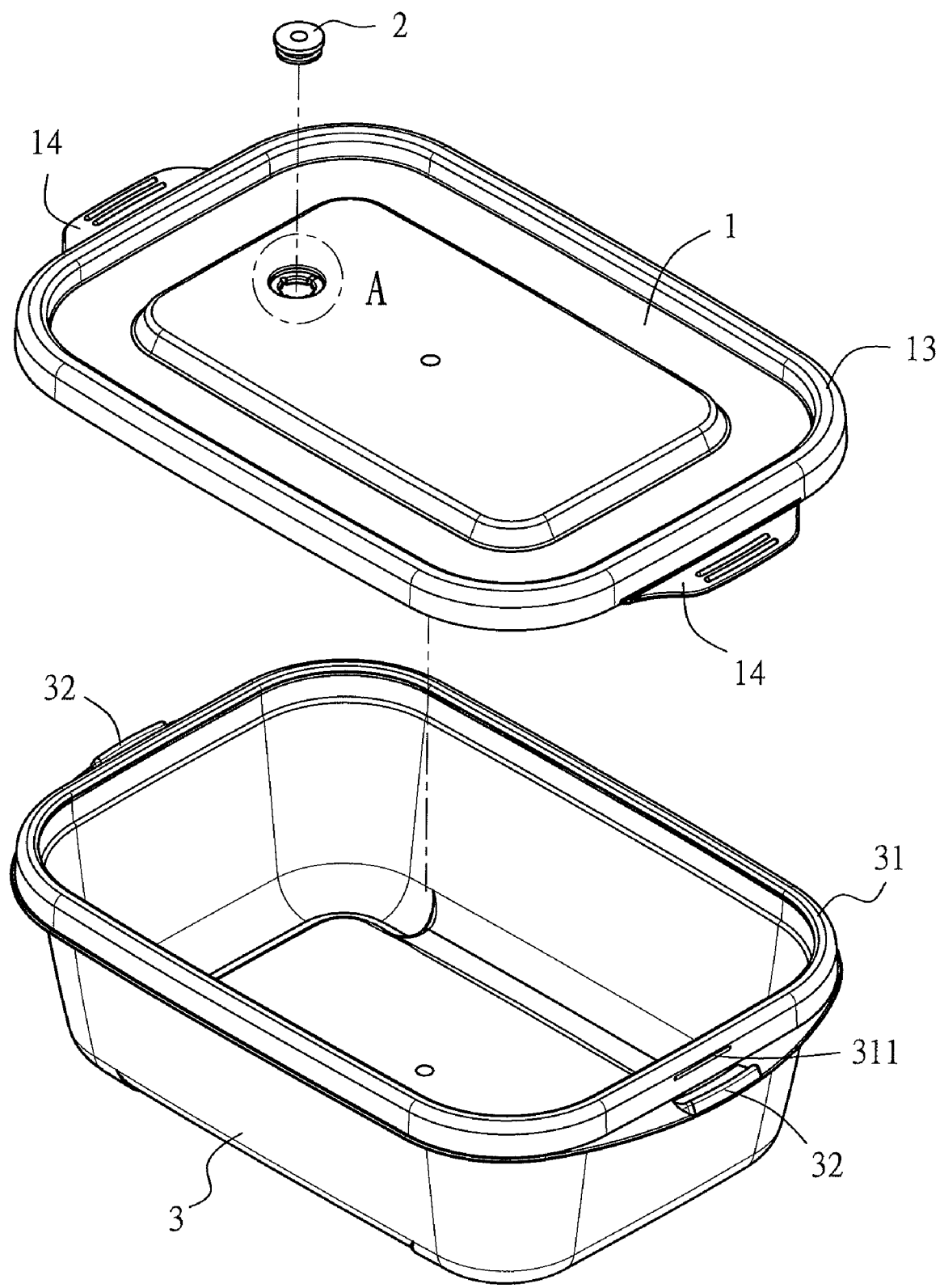
FIG. 1 is an exploded perspective view showing a container according to the present invention.
Figure 6A:
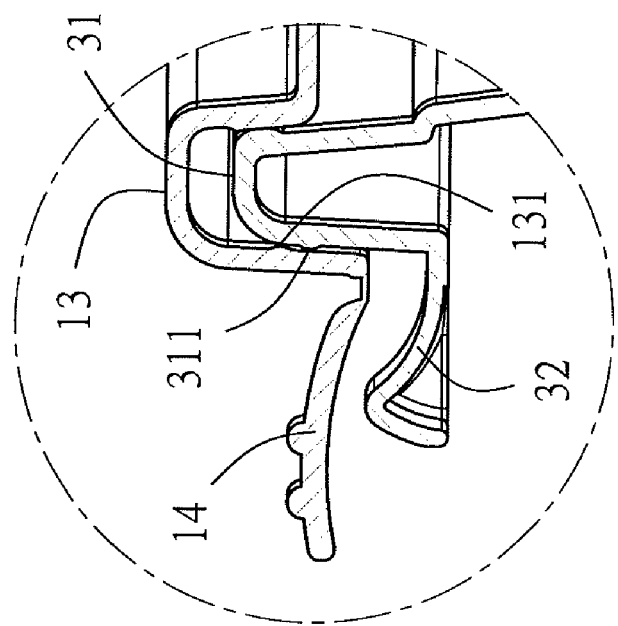
FIG. 6A is partial, enlarged, sectional view of the encircled area A of FIG. 6.
Figure 1A:
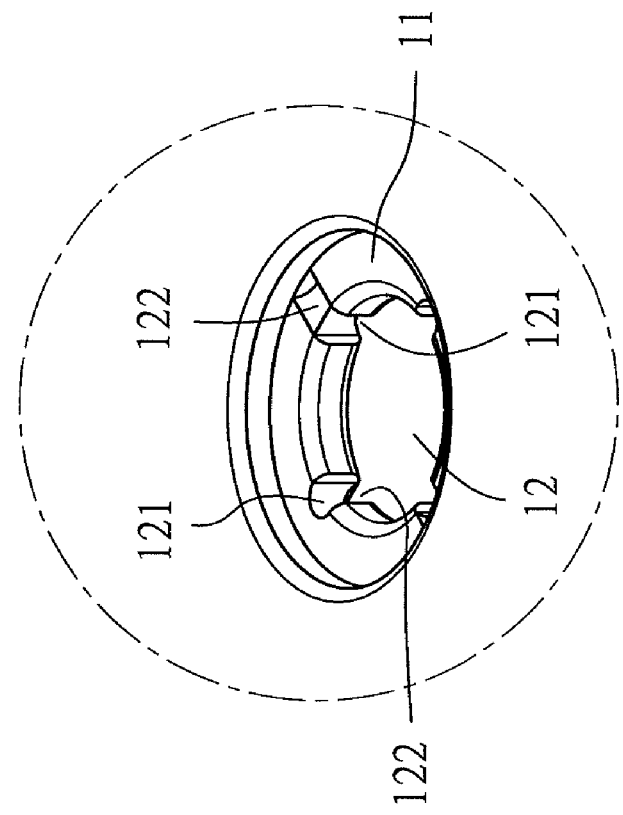
FIG. 1A is a partial, enlarged, perspective view of the encircled area A of FIG. 1.
Figure 2:
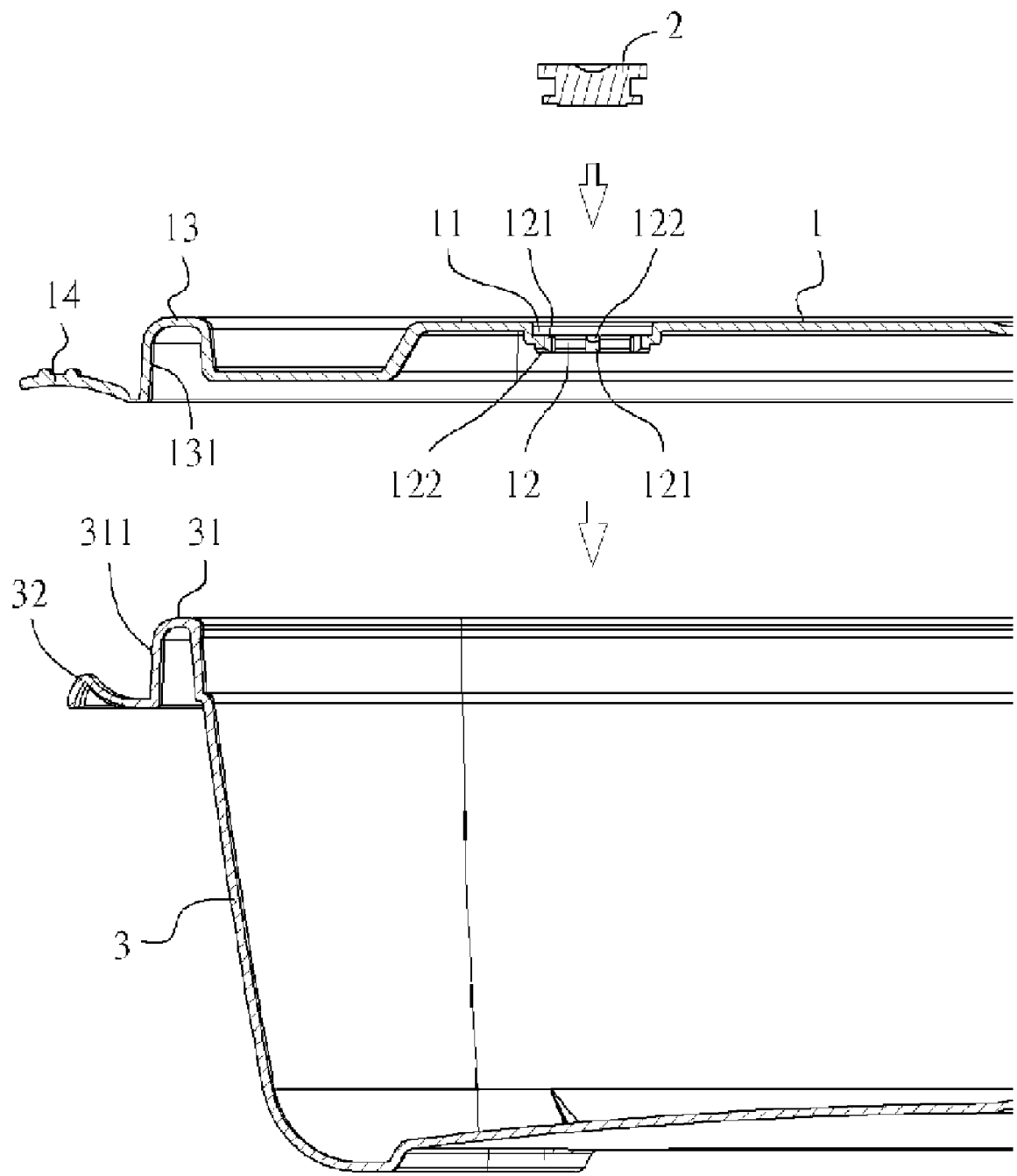
FIG. 2 is an exploded cross-sectional view showing the container according to the present invention.

The invention proposes an improved microwavable container structure, as shown in FIGS. 1 and 2. The microwavable container includes a lid 1 and a holder 3. The lid 1 has a mechanism for venting high-temperature circular vapors 5 in order to prevent the lid 1 has being blown open by the vapors 5 accumulated within the container.

Figure 3:
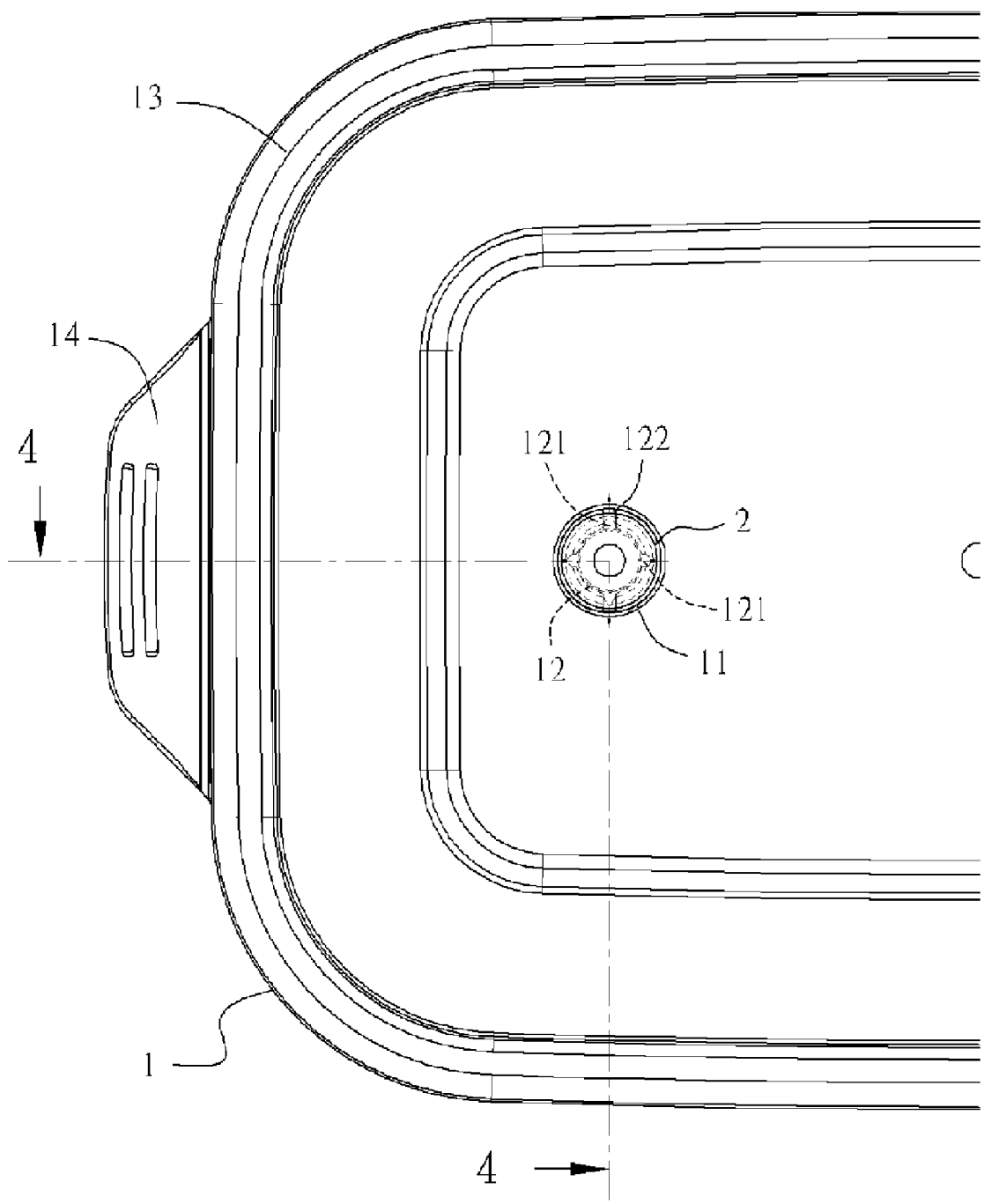
FIG. 3 is a top plan view illustrating the assembled container.

The lid 1 is designed according to the size of the holder 3 and has a recess 11. The recess 11 is formed with a through hole 12 therein. A plurality of air-permeable troughs respectively extend from the periphery of the through hole 12. Each of the air-permeable troughs have inner and outer openings 121 and 122 and the inner and outer openings 121 and 122 of adjacent air-permeable troughs are set in opposite directions, as shown in FIGS. 3 and 4. A sealing portion 13 is formed on an edge of the lid 1 and has a pair of side clip-on pieces 14 extending from two opposite sides of the sealing portion 13. The inner surfaces of the two opposite sides of the sealing portion 13 are respectively formed with lower ribs 131 protruding therefrom.

A marginal frame portion 31 is formed on the periphery of the holder 3. Upward bending portions 32 extend from two opposite sides of the marginal frame portion 31. Upper ribs 311 protrude from the outer surface of the two opposite sides of the marginal frame portion 31.

A plug 2 is formed of elastic material in a ladder shape and has a maximum diameter which is able to cover the inner openings 121 of the through hole 12 but unable to cover the outer openings 122 and a minimum diameter less than that of the through hole 12.

To assemble the plug 2 with the lid 1, referring to FIGS. 3 and 4, the plug 2 is deformable to be pushed and squeezed into the through hole 12 of the lid 1. The inner openings 121 are covered by upper and lower surfaces of the plug 2 of the maximum diameter and there is a space 123 consequently formed between the through hole 12 and plug 2, thereby forming an embedded air-permeable passageway.

Figure 5:
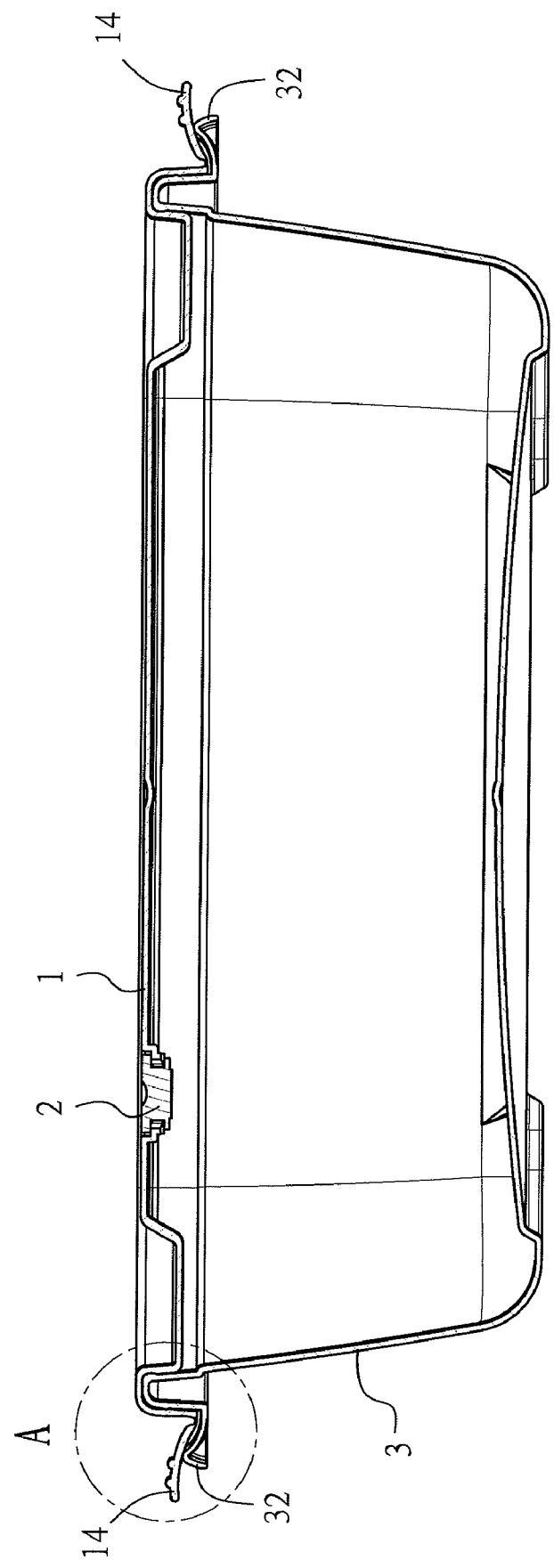
FIG. 5 is a cross-sectional view showing the assembled container.
Figure 5B:
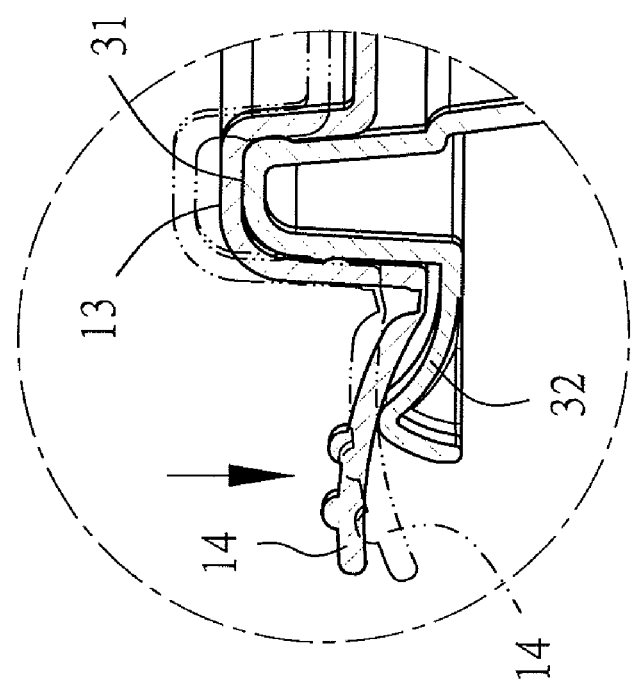
FIG. 5B is partial, enlarged, sectional view of the encircled area A of FIG. 5.
Figure 5A:
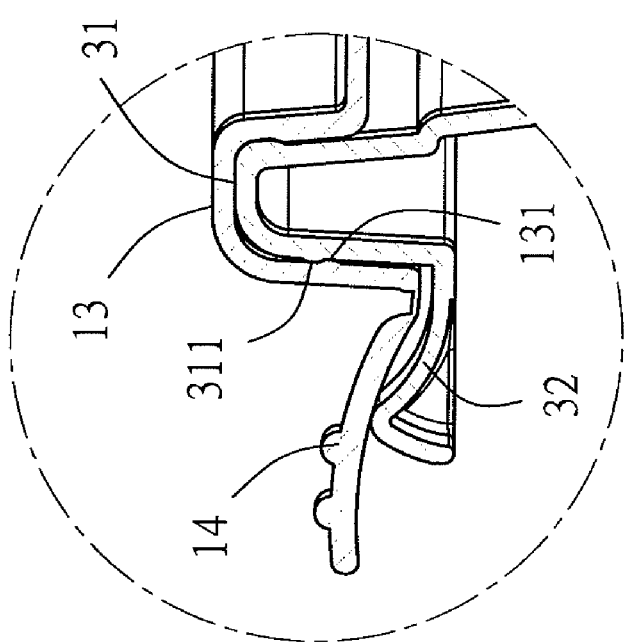
FIG. 5A is partial, enlarged, sectional view of the encircled area A of FIG. 5.

To assemble the lid 1 with the holder 3, referring to FIG. 5, the sealing portion 13 of the lid 1 is fitted and securely positioned onto the marginal frame portion 31 of the holder 3 by mutual restriction of the lower ribs 131 of the lid 1 and the upper ribs 311 of the holder 3.

As to venting of the vapors 5 from the container, please refer to FIG. 4. When the container is heated in a microwave oven, the high-temperature circular vapors 5 generated in the container are regulated and vented via an air-permeable passageway by the following steps. Firstly, the vapors 5 inside of the container flow into the space 123 via the outer openings 122 underneath the air-permeable troughs of the lid 1. Then the vapors 5 rise and flow into the air-permeable trough above it. Finally, the vapors 5 escape out of the container via the outer openings 122 on top of the air-permeable troughs.

Figure 6:
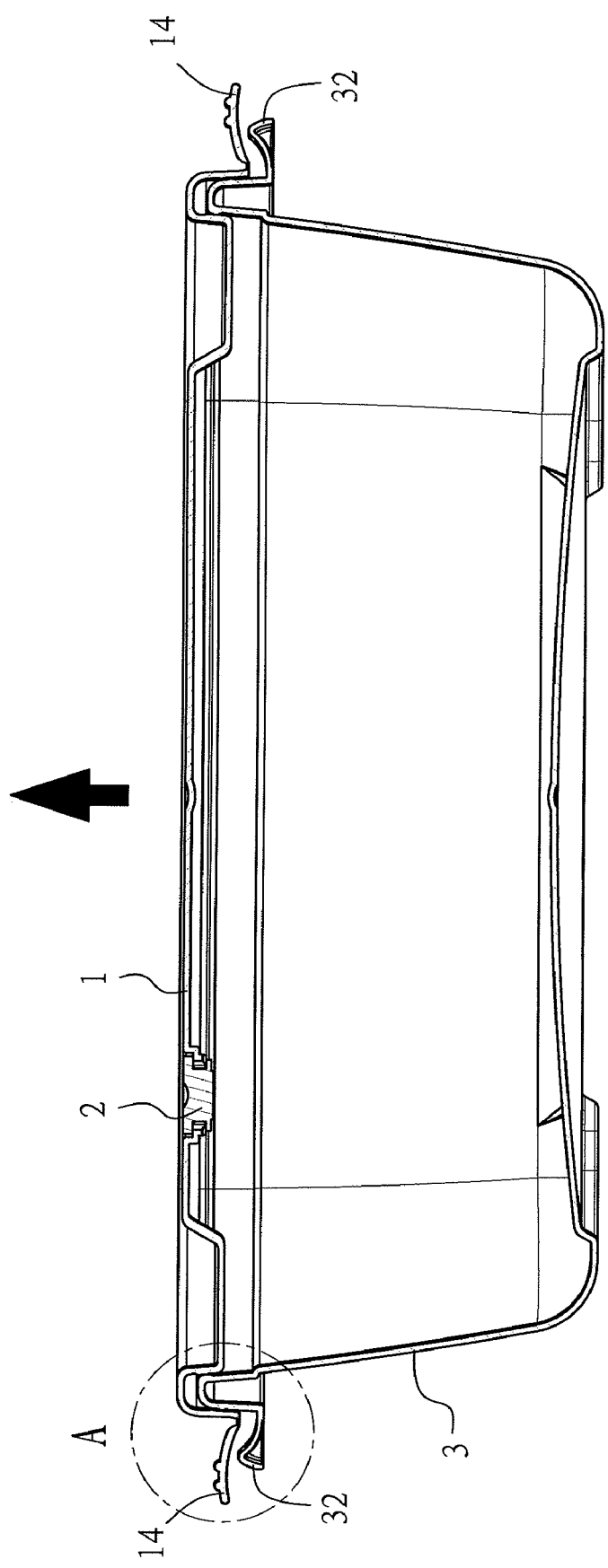
FIG. 6 is a cross-sectional view showing opening of the lid.

As to opening the microwavable container, please refer to FIGS. 5 and 6. Specifically, the side clip-on pieces 14 of the lid 1 are simply pressed down to deform the sealing portion 13 due to its elasticity, as shown in FIG. 5-1. Thus the lower ribs 131 of the lid 1 are freed from the restriction of the upper ribs 311 of the holder 3 so as to open up the lid 1 quickly.

What is claimed is:

1. A container structure comprising: a lid; a holder; wherein the lid has a recess having an annular sidewall terminating in a bottom having an inner surface and an outer surface opposite to the inner surface, with a through hole formed in the bottom extending between the inner and outer surfaces and having a periphery spaced from the annular sidewall, with a plurality of air-permeable troughs extending from the periphery of the through hole, wherein each air-permeable trough is generally L-shaped having first and second legs, with the first legs extending between the inner and outer surfaces of the bottom, with the second leg extending from the first leg on the inner surface of the bottom for one of adjacent air-permeable troughs and with the second leg extending from the first leg on the outer surface of the bottom for another of adjacent air-permeable troughs; and an elastic plug fitted into the though hole, forming an air-permeable passageway;

whereby, when heated, ventilation can be achieved by the air-permeable passageway of the lid and high-temperature circular vapors generated from microwave heating are regulated and vented, thereby preventing the lid from being blown open by the vapors accumulated within the holder.

2. The container structure of claim 1, wherein the plug includes first and seconds portions, with the first portion having a size pressable into the through hole, with the second portion having a size greater than the first portion and the through hole and less than the annular sidewall, with the second portion having a size less than the second legs on the inner surface of the bottom.

3. The container structure of claim 2, wherein the lid has a sealing portion, wherein the holder has a marginal frame portion; wherein the container structure further comprises: clip-on pieces extending outwardly from two opposite sides of the sealing portion of the lid; and upward bending portions extending outwardly from two opposite sides of the marginal frame portion of the holder; wherein the sealing portion of the lid is fitted on the marginal frame portion of the holder; wherein the upward bending portions extend at an acute angle to the marginal frame portion, with the clip-on pieces extending at an acute angle to the sealing portion fitted on the marginal frame portion and supported upon the upward bending portions, with the clip-on pieces extending outwardly beyond the upward bending portions so that pressing the clip-on pieces of the lid down will deform the sealing portion so as to open the lid quickly.

4. The container structure of claim 3, wherein an inner surface of the sealing portion of the lid is provided with lower ribs and an outer surface of the marginal frame portion of the holder is provided with upper ribs so that the lid is securely fitted onto the holder by mutual restriction of the tower and upper ribs.

5. The container structure of claim 1, wherein the lid has a seating portion, wherein the holder has a marginal frame portion; wherein the container structure further comprises: clip-on pieces extending outwardly from two opposite sides of the sealing portion of the lid; and upward bending portions extending outwardly from two opposite sides of the marginal frame portion of the holder; wherein the sealing portion of the lid is fitted on the marginal frame portion of the holder; wherein the upward bending portions extend at an acute angle to the marginal frame portion, with the clip-on pieces extending at an acute angle to the sealing portion fitted on the marginal frame portion and supported upon the upward bending portions, with the clip-on pieces extending outwardly beyond the upward bending portions so that pressing the clip-on pieces of the lid down will deform the sealing portion so as to open the lid quickly.

6. The container structure of claim 5, wherein an inner surface of the sealing portion of the lid is provided with lower ribs and an outer surface of the marginal frame portion of the holder is provided with upper ribs so that the lid is securely fitted onto the holder by mutual restriction of the lower and upper ribs.

* * * * *